US012588023B2

(12) United States Patent
Yang et al.

(10) Patent No.: US 12,588,023 B2
(45) Date of Patent: Mar. 24, 2026

(54) METHOD AND DEVICE FOR TRANSMITTING AND RECEIVING WIRELESS SIGNAL IN WIRELESS COMMUNICATION SYSTEM

(71) Applicant: LG Electronics Inc., Seoul (KR)

(72) Inventors: Suckchel Yang, Seoul (KR); Jiwon Kang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 498 days.

(21) Appl. No.: 18/040,741

(22) PCT Filed: Aug. 6, 2021

(86) PCT No.: PCT/KR2021/010441
§ 371 (c)(1),
(2) Date: Feb. 6, 2023

(87) PCT Pub. No.: WO2022/031125
PCT Pub. Date: Feb. 10, 2022

(65) Prior Publication Data
US 2023/0328729 A1     Oct. 12, 2023

Related U.S. Application Data

(60) Provisional application No. 63/062,405, filed on Aug. 6, 2020.

(51) Int. Cl.
*H04W 72/23*        (2023.01)
*H04W 24/10*        (2009.01)
(Continued)

(52) U.S. Cl.
CPC ....... *H04W 72/1273* (2013.01); *H04W 24/10* (2013.01); *H04W 72/232* (2023.01)

(58) Field of Classification Search
CPC .......... H04W 72/1273; H04W 72/232; H04W 24/10; H04L 5/0053; H04L 5/007;
(Continued)

(56) References Cited

U.S. PATENT DOCUMENTS

2017/0367046 A1* 12/2017 Papasakellariou .... H04W 72/23
2018/0131426 A1    5/2018 Lee et al.
(Continued)

OTHER PUBLICATIONS

3GPP TS 38.214 V15.5.0 (Mar. 2019), 3rd Generation Partnership Project Technical Specification Group Radio Access Network, Study on Physical layer procedures for data (Release 15), Mar. 2019, 103 pages.
(Continued)

*Primary Examiner* — Andrew Lee
(74) *Attorney, Agent, or Firm* — Fish & Richardson P.C.

(57) ABSTRACT

The present disclosure relates to a wireless communication system, and specifically to a method and device therefor, the method comprising the steps of: receiving CSI-RS resource configuration information; receiving DCI indicating CSI-RS transmission; and receiving CSI-RS in one or more CSI-RS resource sets corresponding to the DCI, wherein the DCI corresponds to a CSI-RS resource set in at most one slot on the basis that subcarrier spacing (SCS) within a first range is applied to the CSI-RS transmission, the DCI corresponds to a plurality of CSI-RS resource sets in different slots on the basis that SCS within a second range is applied to the CSI-RS transmission, the first range does not overlap the second range, and the second range is wider than the first range.

7 Claims, 21 Drawing Sheets

○ CSI-RS feedback triggering DCI

▨ CSI-RS resource in the same CSI-RS resource set

△ CSI-RS report

(51) Int. Cl.
  *H04W 72/1273*        (2023.01)
  *H04W 72/232*         (2023.01)
(58) Field of Classification Search
  CPC ....... H04L 5/0094; H04L 5/005; H04B 7/088;
                  H04B 7/06952; H04B 7/0696
  See application file for complete search history.

(56) References Cited

U.S. PATENT DOCUMENTS

| | | | |
|---|---|---|---|
| 2018/0262313 A1* | 9/2018 | Nam | H04L 5/0044 |
| 2019/0020454 A1 | 1/2019 | Kim et al. | |
| 2019/0058517 A1 | 2/2019 | Kang et al. | |
| 2020/0052813 A1* | 2/2020 | Hosseini | H04L 1/0067 |
| 2021/0075488 A1* | 3/2021 | Wu | H04B 7/0626 |
| 2021/0289441 A1* | 9/2021 | Li | H04W 52/0216 |
| 2021/0410097 A1* | 12/2021 | Munier | H04L 1/0067 |
| 2022/0295297 A1* | 9/2022 | Li | H04W 16/28 |
| 2022/0322195 A1* | 10/2022 | Tullberg | H04W 36/08 |
| 2023/0107562 A1* | 4/2023 | Wang | H04L 1/1896 |
| | | | 370/329 |
| 2024/0106606 A1* | 3/2024 | He | H04L 5/0053 |

OTHER PUBLICATIONS

Ericsson, "Feature lead summary 2 on beam measurement and reporting, " R1-1805574, 3GPP TSG RAN WG1 Meeting #92b, Sanya, China, Apr. 16-20, 2018, 29 pages.

Extended European Search Report in European Appln. No. 21853647.2, mailed on Aug. 16, 2024, 8 pages.

International Search Report and Written Opinion in International Appln. No. PCT/KR2021/010441, mailed on Nov. 24, 2021, 11 pages.

LG Electronics, "Consideration on required physical layer changes to support NR above 52.6 GHz, " 3GPP TSG RAN WI #101, R1-2004038, e-Meeting, May 25-Jun. 5, 2020, 9 pages.

Qualcomm Incorporated, "NR using existing DL/UL NR waveform to support operation between 52.6 GHz and 71 GHz," 3GPP TSG-RAN WG1 #101-e, R1-2004500, e-Meeting, May 25-Jun. 5, 2020, 18 pages.

Ericsson, "Miscellaneous non-controversial corrections Set II," R2-1908150, 3GPP TSG-RAN2 Meeting #106, Reno, US, May 13-17, 2019, 481 pages.

Moderator (Nokia), "FL summary on aperiodic CSI-RS triggering with different numerology between CSI-RS and triggering PDCCH," R1-2004638, 3GPP TSG RAN WG1 #101, e-Meeting, May 25-Jun. 5, 2020, 11 pages.

Office Action in Korean Appln. No. 10-2023-7006068, mailed on May 26, 2025, 10 pages (with English translation).

* cited by examiner

Copy

| CP (T_cp) | SP (T_sp) |

OFDM symbol (OS; T_os)

UL grant-to-PUSCH offset (K2)

PDCCH

PUSCH (a)                    (b)

Slot offset Kc isconfigured per CSI-RS resource set

Slot offset Kc independently configured per CSI-RS resource in a CSI-RS resource set ○   CSI-RS feedback triggering DCI ▦   CSI-RS resource in the same CSI-RS resource set △   CSI-RS report Slot offset Kc isconfigured per CSI-RS resource set Common slot offset Kc is configured CSI-RS resource set,
and relative slot offset Kr is configured per CSI-RS resource set ○  CSI-RS feedback triggering DCI ▦  CSI-RS resource in the same CSI-RS resource set △  CSI-RS report Slot offset Kc isconfigured per CSI-RS resource set Slot offset Kc is independently configured per CSI-RS resource set Mapped to a same state of CSI request field
in the CSI-RS feedback triggering DCI ○ CSI-RS feedback triggering DCI ▦ Different CSI-RS resource set △ CSI-RS report Device(100, 200)

METHOD AND DEVICE FOR TRANSMITTING AND RECEIVING WIRELESS SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2021/010441, filed on Aug. 6, 2021, which claims the benefit of U.S. Provisional Application No. 63/062,405, filed on Aug. 6, 2020. The disclosures of the prior applications are incorporated by reference in their entirety.

TECHNICAL FIELD

The present disclosure relates to a wireless communication system, and more particularly to a method and device for transmitting and receiving a wireless signal.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An objective of the present disclosure is to provide a method of effectively performing a procedure of transmitting and receiving a wireless signal and a device therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

According to a first aspect of the present disclosure, a method used by a user equipment (UE) in a wireless communication system includes receiving channel state information reference signal (CSI-RS) resource configuration information, receiving downlink control information (DCI) indicating transmission of the CSI-RS, and receiving the CSI-RS in one or more CSI-RS resource sets corresponding to the DCI based on the CSI-RS resource configuration information, wherein the DCI corresponds to a CSI-RS resource set within one slot at most based on that a subcarrier spacing (SCS) within a first range is applied to transmission of the CSI-RS, the DCI corresponds to a plurality of CSI-RS resource sets within different slots based on that a SCS within a second range is applied to transmission of the CSI-RS, and the first range and the second range do not overlap, and the second range is greater than the first range.

According to a second aspect of the present disclosure, a user equipment (UE) used in a wireless communication system includes at least one radio frequency (RF) unit, at least one processor, and at least one computer memory operatively connected to the at least one processor and configured to cause the at least one processor to perform an operation when being executed, the operation including receiving channel state information reference signal (CSI-RS) resource configuration information, receiving downlink control information (DCI) indicating transmission of the CSI-RS, and receiving the CSI-RS in one or more CSI-RS resource sets corresponding to the DCI based on the CSI-RS resource configuration information, wherein the DCI corresponds to a CSI-RS resource set within one slot at most based on that a subcarrier spacing (SCS) within a first range is applied to transmission of the CSI-RS, the DCI corresponds to a plurality of CSI-RS resource sets within different slots based on that a SCS within a second range is applied to transmission of the CSI-RS, and the first range and the second range do not overlap, and the second range is greater than the first range.

According to a third aspect of the present disclosure, a device for a user equipment (UE) includes at least one processor, and at least one computer memory operatively connected to the at least one processor and configured to cause the at least one processor to perform an operation when being executed, the operation including receiving channel state information reference signal (CSI-RS) resource configuration information, receiving downlink control information (DCI) indicating transmission of the CSI-RS, and receiving the CSI-RS in one or more CSI-RS resource sets corresponding to the DCI based on the CSI-RS resource configuration information, wherein the DCI corresponds to a CSI-RS resource set within one slot at most based on that a subcarrier spacing (SCS) within a first range is applied to transmission of the CSI-RS, the DCI corresponds to a plurality of CSI-RS resource sets within different slots based on that a SCS within a second range is applied to transmission of the CSI-RS, and the first range and the second range do not overlap, and the second range is greater than the first range.

According to a fourth aspect of the present disclosure, a computer readable storage includes at least one computer program for causing at least one processor to perform an operation when being executed, the operation including receiving channel state information reference signal (CSI-RS) resource configuration information, receiving downlink control information (DCI) indicating transmission of the CSI-RS, and receiving the CSI-RS in one or more CSI-RS resource sets corresponding to the DCI based on the CSI-RS resource configuration information, wherein the DCI corresponds to a CSI-RS resource set within one slot at most based on that a subcarrier spacing (SCS) within a first range is applied to transmission of the CSI-RS, the DCI corresponds to a plurality of CSI-RS resource sets within different slots based on that a SCS within a second range is applied to transmission of the CSI-RS, and the first range and the second range do not overlap, and the second range is greater than the first range.

According to a fifth aspect of the present disclosure, a method used by a base station (BS) in a wireless communication system includes receiving channel state information reference signal (CSI-RS) resource configuration information, receiving downlink control information (DCI) indicating transmission of the CSI-RS, and receiving the CSI-RS in one or more CSI-RS resource sets corresponding to the DCI based on the CSI-RS resource configuration information, wherein the DCI corresponds to a CSI-RS resource set within one slot at most based on that a subcarrier spacing (SCS) within a first range is applied to transmission of the CSI-RS, the DCI corresponds to a plurality of CSI-RS resource sets within different slots based on that a SCS within a second range is applied to transmission of the CSI-RS, and the first range and the second range do not overlap, and the second range is greater than the first range.

According to a sixth aspect of the present disclosure, a base station (BS) used in a wireless communication system includes at least one radio frequency (RF) unit, at least one processor, and at least one computer memory operatively connected to the at least one processor and configured to cause the at least one processor to perform an operation when being executed, the operation including transmitting channel state information reference signal (CSI-RS) resource configuration information, transmitting downlink control information (DCI) indicating transmission of the CSI-RS, and transmitting the CSI-RS in one or more CSI-RS resource sets corresponding to the DCI based on the CSI-RS resource configuration information, wherein the DCI corresponds to a CSI-RS resource set within one slot at most based on that a subcarrier spacing (SCS) within a first range is applied to transmission of the CSI-RS, the DCI corresponds to a plurality of CSI-RS resource sets within different slots based on that a SCS within a second range is applied to transmission of the CSI-RS, and the first range and the second range do not overlap, and the second range is greater than the first range.

A maximum SCS belonging to the first range may be 120 KHz, and a minimum SCS belonging to the second range may be a multiple of 120 KHz.

The one or more CSI-RS resource set may be for downlink beam management, and a corresponding transmit beam-receive beam pair may be applied to each CSI-RS resource set, and the transmit beam-receive beam pair may be changed in units of CSI-RS resource sets.

The method may further include transmitting a measurement result of the one or more CSI-RS resource set.

According to the present disclosure, a wireless signal may be transmitted and received efficiently in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 7 illustrates a physical uplink shared channel (PUSCH) transmission process;

DETAILED DESCRIPTION

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive machine type communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
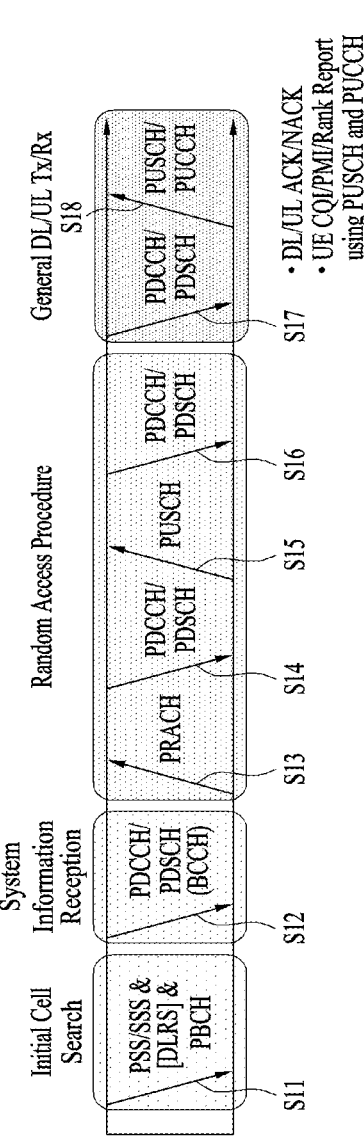
FIG. 1 illustrates physical channels used in a 3rd generation partnership project (3GPP) system as an exemplary wireless communication systems and a general signal transmission method using the same.

FIG. 1 illustrates physical channels used in a 3GPP NR system and a general signal transmission method using the same.

When powered on or when a UE initially enters a cell, the UE performs initial cell search involving synchronization with a BS in step S101. For initial cell search, the UE receives synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
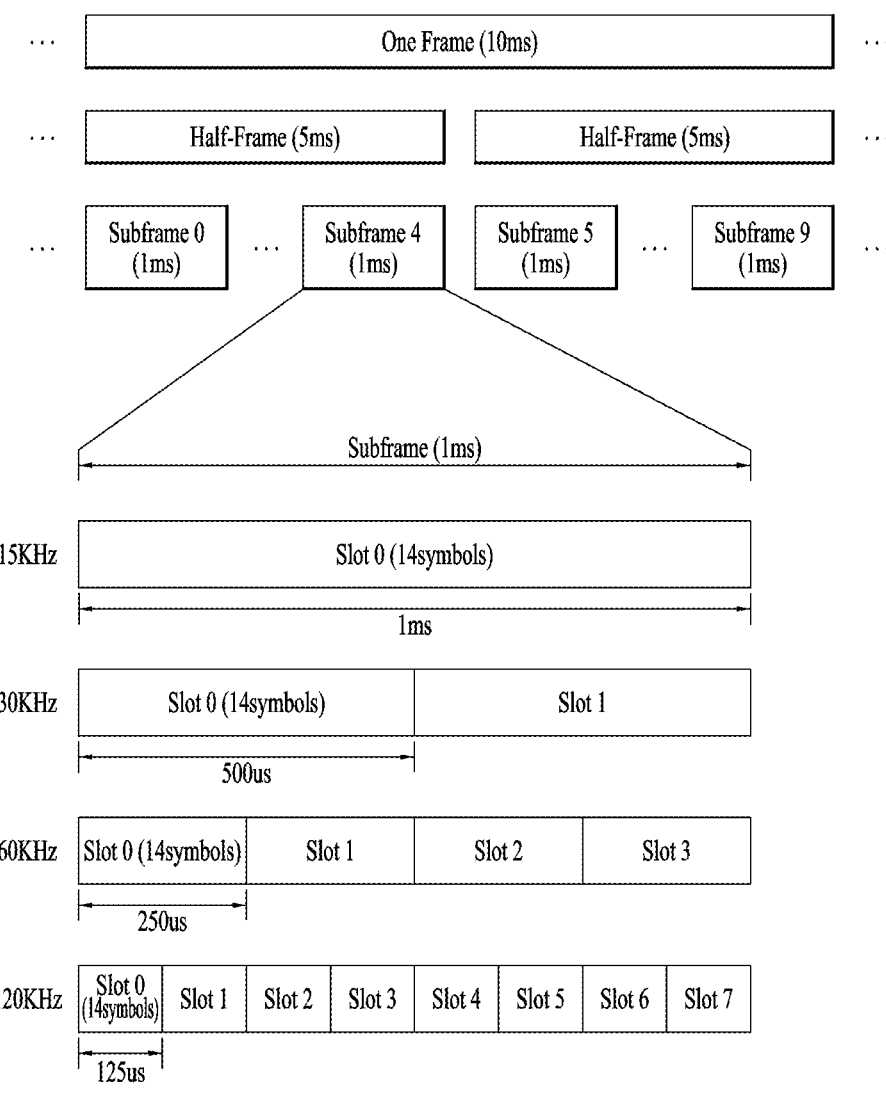
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 orthogonal frequency division multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |

TABLE 1-continued

| SCS ($15*2^u$) | $N^{slot}_{symb}$ | $N^{frame, u}_{slot}$ | $N^{subframe, u}_{slot}$ |
|---|---|---|---|
| 120 KHz (u = 3) | 14 | 80 | 8 |
| 240 KHz (u = 4) | 14 | 160 | 16 |

\* $N^{slot}_{symb}$: Number of symbols in a slot
\* $N^{frame, u}_{slot}$: Number of slots in a frame
\* $N^{subframe, u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The frame structure is merely an example. The number of subframes, the number of slots, and the number of symbols in a frame may vary.

In the NR system, different OFDM numerologies (e.g., SCSs) may be configured for a plurality of cells aggregated for one UE. Accordingly, the (absolute time) duration of a time resource including the same number of symbols (e.g., a subframe (SF), slot, or TTI) (collectively referred to as a time unit (TU) for convenience) may be configured to be different for the aggregated cells. A symbol may be an OFDM symbol (or CP-OFDM symbol) or an SC FDMA symbol (or a discrete Fourier transform-spread-OFDM (DFT-s-OFDM) symbol).

Figure 3:
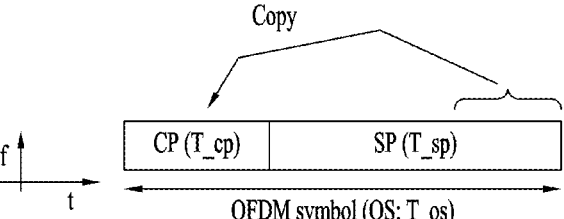
FIG. 3 illustrates an OS (OFDM symbol) structure.

FIG. 3 illustrates an OS (OFDM symbol) structure. The OS includes a CP and a symbol part (SP). An OS section is defined as CP section+SP section. The CP is copied from the end of the SP and is used to remove inter-symbol interference. T_xx represents the time length/interval (e.g., the number of samples) of XX. The SP length is inversely proportional to SCS (refer to FIG. 2). Here, the OS may refer to both CP-OFDM symbols and DFT-s-OFDM symbols.

Figure 4:
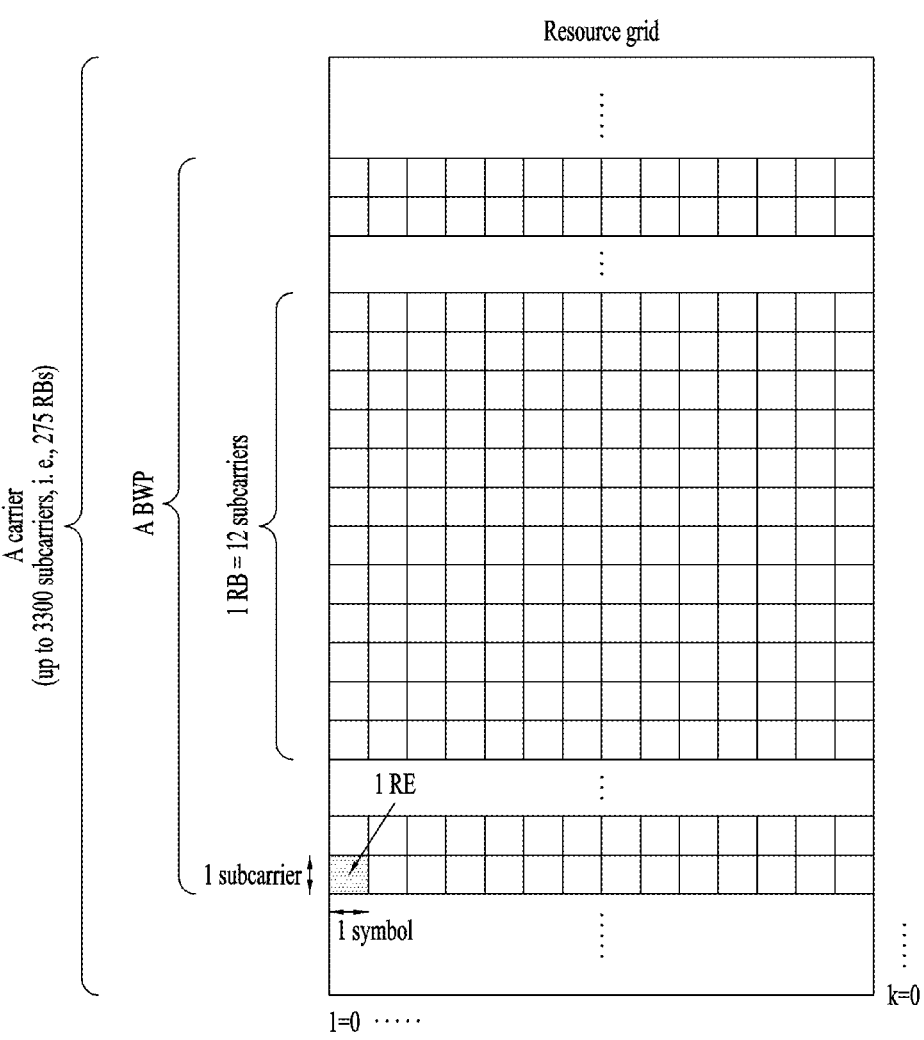
FIG. 4 illustrates a resource grid of a slot.

FIG. 4 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 5:
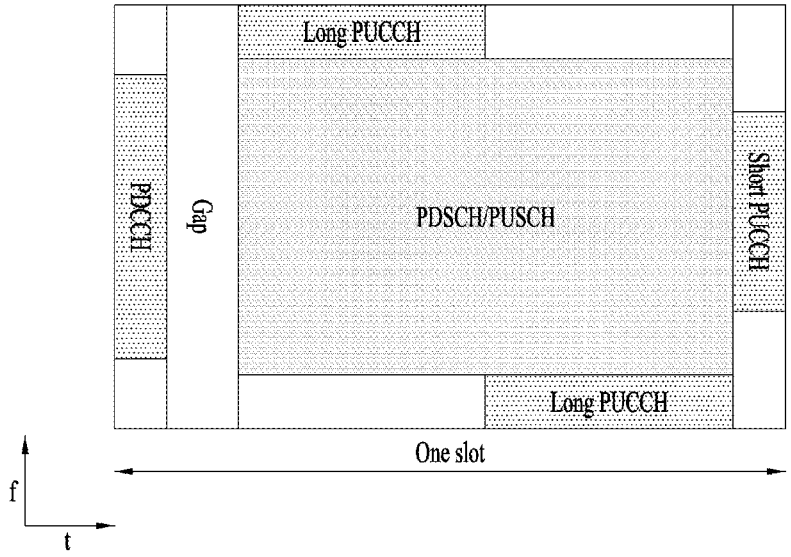
FIG. 5 illustrates mapping of physical channels in a slot.

FIG. 5 illustrates exemplary mapping of physical channels in a slot. In the NR system, a frame is characterized by a self-contained structure in which all of a DL control channel, DL or UL data, and a UL control channel may be included in one slot. For example, the first N symbols of a slot may be used for a DL control channel (e.g., PDCCH) (hereinafter, referred to as a DL control region), and the last M symbols of the slot may be used for a UL control channel (e.g., PUCCH) (hereinafter, referred to as a UL control region). Each of N and M is an integer equal to or larger than 0. A resource area (referred to as a data region) between the DL control region and the UL control region may be used for transmission of DL data (e.g., PDSCH) or UL data (e.g., PUSCH). A guard period (GP) provides a time gap for switching between a transmission mode and a reception mode at the BS and the UE. Some symbol at the time of switching from DL to UL may be configured as a GP.

The PDCCH carries downlink control information (DCI). For example, the PCCCH (i.e., DCI) carries a transmission format and resource allocation of a downlink shared channel (DL-SCH), resource allocation information about an uplink shared channel (UL-SCH), paging information about a paging channel (PCH), system information present on the DL-SCH, resource allocation information about a higher layer control message such as a random access response transmitted on a PDSCH, a transmit power control command, and activation/release of configured scheduling (CS). The DCI includes a cyclic redundancy check (CRC). The CRC is masked/scrambled with different identifiers (e.g., radio network temporary identifier (RNTI)) according to the owner or usage of the PDCCH. For example, if the PDCCH is for a specific UE, the CRC will be masked with a UE identifier (e.g., cell-RNTI (C-RNTI)). If the PDCCH is for paging, the CRC will be masked with a paging-RNTI (P-RNTI). If the PDCCH is for system information (e.g., a system information block (SIB)), the CRC will be masked with a system information RNTI (SI-RNTI). If the PDCCH is for a random access response, the CRC will be masked with a random access-RNTI (RA-RNTI).

Figure 6:
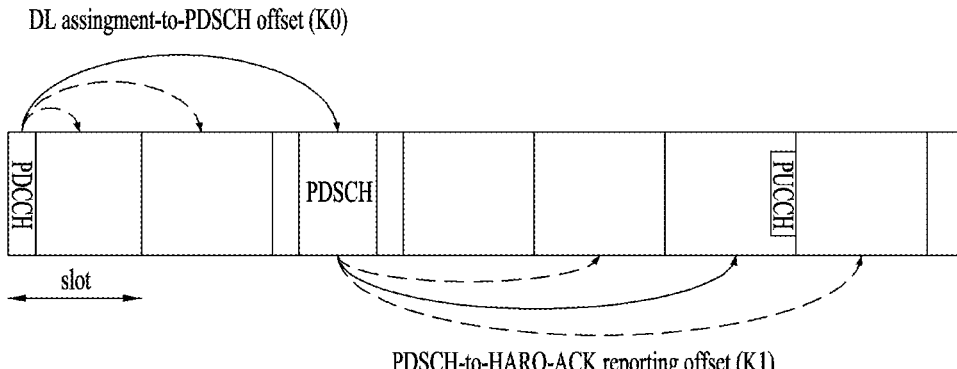
FIG. 6 illustrates an acknowledgment/negative acknowledgement (ACK/NACK) transmission process.
Figure 9:
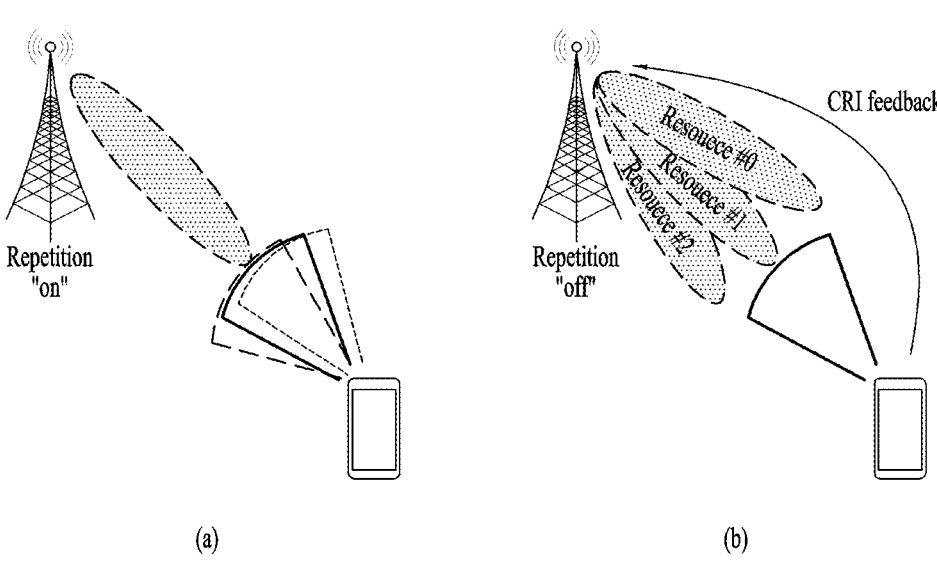

FIG. 6 illustrates an ACK/NACK transmission procedure. Referring to FIG. 9, the UE may detect a PDCCH in slot #n. Here, the PDCCH includes downlink scheduling information (e.g., DCI format 1_0 or 1_1). The PDCCH indicates a DL assignment-to-PDSCH offset (K0) and a PDSCH-HARQ-ACK reporting offset (K1). For example, DCI format 1_0 or 1_1 may include the following information.

Frequency domain resource assignment (FDRA): Indicates an RB set assigned to the PDSCH.

Time domain resource assignment (TDRA): Indicates K0 and the starting position (e.g. OFDM symbol index) and duration (e.g. the number of OFDM symbols) of the PDSCH in a slot. TDRA may be indicated by a start and length indicator value (SLIV).

PDSCH-to-HARQ feedback timing indicator: Indicates K1.

HARQ process number (4 bits): Indicates an HARQ process identify (ID) for data (e.g., PDSCH or TB).

PUCCH resource indicator (PRI): Indicates PUCCH resources to be used for UCI transmission among a plurality of resources in a PUCCH resource set.

After receiving the PDSCH in slot #(n+K0) according to the scheduling information of slot #n, the UE may transmit UCI on the PUCCH in slot #(n+K1). Here, the UCI includes a HARQ-ACK response to the PDSCH. In the case where the PDSCH is configured to transmit a maximum of one TB, the HARQ-ACK response may be configured in one bit. In the case where the PDSCH is configured to transmit a maximum of two TBs, the HARQ-ACK response may be configured in two bits if spatial bundling is not configured and may be configured in one bit if spatial bundling is configured. When slot #(n+K1) is designated as a HARQ-ACK transmission time for a plurality of PDSCHs, the UCI transmitted in slot #(n+K1) includes HARQ-ACK responses to the plurality of PDSCHs.

Figure 7:
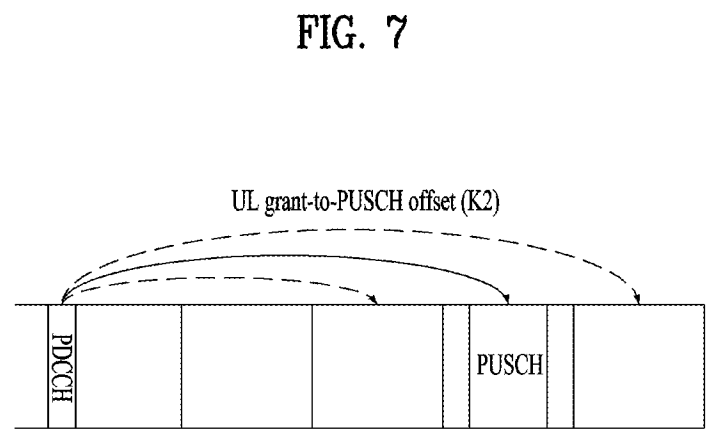
Figure 10:
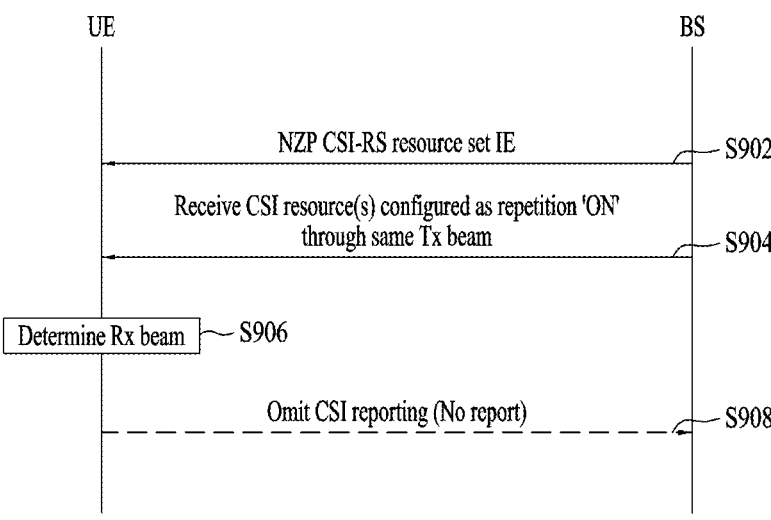

FIG. 7 illustrates an exemplary PUSCH transmission procedure. Referring to FIG. 10, a UE may detect a PDCCH in slot #n. The PDCCH may include UL scheduling information (e.g., DCI format 0_0, DCI format 0_1). DCI format 0_0 and DCI format 0_1 may include the following information.

FDRA: this indicates an RB set allocated to a PUSCH.

TDRA: this specifies a slot offset K2 indicating the starting position (e.g., symbol index) and length (e.g., the number of OFDM symbols) of the PUSCH in a slot. The starting symbol and length of the PUSCH may be indicated by a SLIV, or separately.

The UE may then transmit the PUSCH in slot #(n+K2) according to the scheduling information in slot #n. The PUSCH includes a UL-SCH TB. When the PUCCH transmission time overlaps with the PUSCH transmission time, UCI may be transmitted on the PUSCH (PUSCH piggyback).

Beam Management (BM)

A BM procedure may include the following as an L1 (layer 1)/L2 procedure for acquiring/maintaining a BS and a set of UE beams, which are to be used for DL/UL transmission/reception.

Figure 8:
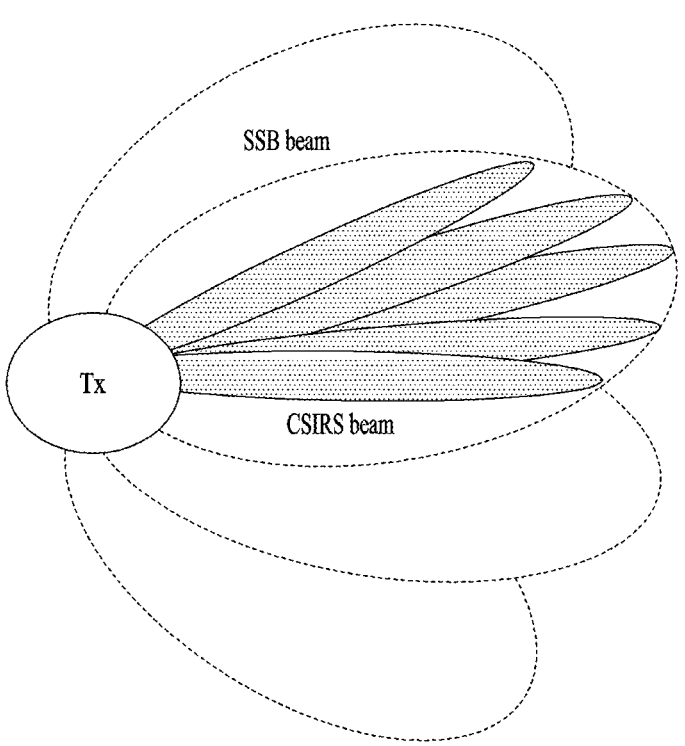
FIGS. 8 to 11 illustrate a beam management procedure.

Beam Measurement: Operation of measuring the characteristics of a beamforming signal received by a B S/UE Beam Determination: Operation in which a BS/UE selects Tx beam/Rx beam thereof Beam sweeping: Beam sweeping: Operation of covering a spatial area using a transmit and/or receive beam for a predetermined time interval in a predetermined manner Beam Reporting: Operation of UE reporting beam measurement information The BM procedure may be classified into (1) a DL BM procedure using a synchronization signal (SS)/physical broadcast channel (PBCH) block (hereinafter referred to as SSB) or a channel state information reference signal (CSI-RS), and (2) a UL BM procedure using a sounding reference signal (SRS). FIG. 8 illustrates SSB beams and CSI-RS beams used in the DL BM. In addition, the BM procedure may include Tx beam sweeping to determine the Tx beam and Rx beam sweeping to determine the Rx beam.

Figure 11:
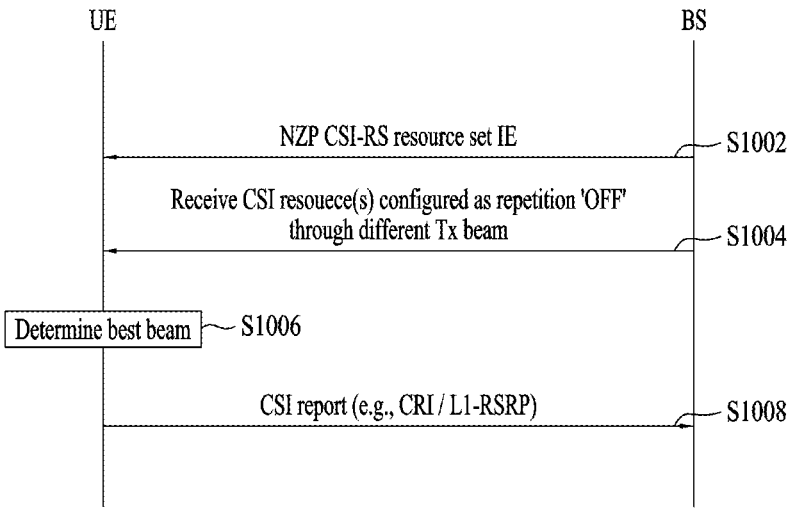

FIG. 9 shows an example of a DL BM procedure using CSI-RS. FIG. 10 shows an Rx beam determination (or refinement) procedure of a UE. FIG. 11 shows a Tx beam sweeping procedure of a BS. FIG. 10 illustrates the case in which a repetition parameter is configured to 'ON'. FIG. 11 illustrates the case in which a repetition parameter is configured to 'OFF'.

With reference to FIGS. 9 and 10, an Rx beam determination procedure of a UE will be described.

The UE may receive a Non-Zero Power (NZP) CSI-RS resource set Information Element (IE) including higher layer parameter repetition from the BS through Radio Resource Control (RRC) signaling (S902). Here, the repetition parameter is assumed to be 'ON'.

The BS may transmit resource(s) in the CSI-RS resource set configured to repetition 'ON' through the same Tx beam (or DL spatial domain transmission filter). In contrast, the UE may receive the resource(s) in the CSI-RS resource set configured to repetition 'ON' through different Rx beams (S904). The Rx beam may be changed in units of OFDM symbols (S904).

Based on beam reception/measurement, the UE may determine an Rx beam thereof (S906).

Based on the repetition 'ON', the UE may omit the CSI report (S908).

With reference to FIGS. 9 and 11, a Tx beam determination procedure of a BS will be described.

The UE may receive an NZP CSI-RS resource set IE including higher layer parameter repetition from the BS through RRC signaling (S1002). Here, the repetition parameter is configured 'OFF' and is related to the Tx beam sweeping procedure of the BS.

The BS may transmit the resource(s) in the CSI-RS resource set configured to repetition 'OFF' through different Tx beams (or DL spatial domain transmission filters). The Tx beam is changed in units of OFDM symbols. In contrast, the UE may receive the resource(s) in the CSI-RS resource set configured to repetition 'OFF' through the same Rx beam (S904).

The UE may select (or determine) the best Tx beam (S1006).

Based on the repetition 'OFF', the UE may report the ID (e.g., CSI-RS resource indicator (CRI)) and related quality information (e.g., Layer 1 Received Signal Received Power (L1-RSRP)) for the selected Tx beam to the BS (S1008).

Figure 12:
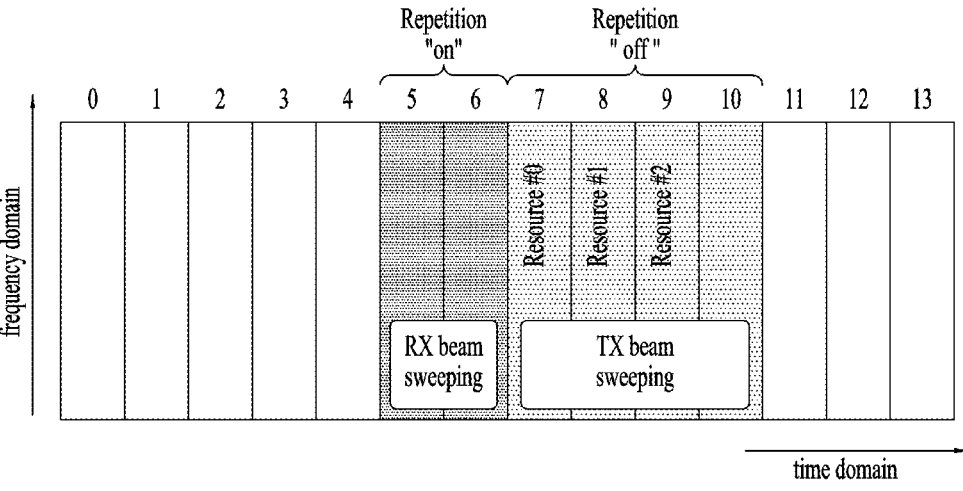
FIG. 12 illustrates a CSI-RS resource set for beam management.

FIG. 12 illustrates CSI-RS resource allocation in the time and frequency domains. Referring to FIG. 12, when repetition 'ON' is configured in the CSI-RS resource set, the CSI-RS is transmitted through the same transmission beam on a plurality of CSI-RS resources, and when repetition 'OFF' is configured in the CSI-RS resource set, CSI-RSs on different CSI-RS resources are transmitted through different transmission beams for each CSI-RS resource. CSI-RS resources are configured in units of OFDM symbols.

Embodiment: Beam Management

Until recently (over 3GPP Rel-15/16), 3GPP has been standardizing a 5G system named New RAT (hereinafter referred to as NR). An NR system aims to support multiple logical networks in a single physical system. To this end, the NR system is designed to support services (e.g., eMBB, mMTC, URLLC) with various requirements by operating/changing an analog/hybrid beamforming operation, etc. in consideration of various OFDM numerologies (e.g., OFDM symbol interval, SCS, or CP length) and a wide operating frequency range (up to approximately 50 GHz), and high frequency band characteristics.

In recent 3GPP Rel-17, the need for development of an NR (hereinafter, High Frequency (HF) NR) system operating in a higher frequency band than the existing 3GPP Rel-15/16-based NR system is being considered. In the HF NR system, introduction and application of a new OFDM numerology based on a larger SCS (e.g., 240 KHz, 480 KHz, and 960 KHz, hereinafter, large SCS) than the existing NR SCS (e.g., 15 KHz, 30 KHz, 60 KHz, and 120 KHz) may be considered in consideration of wireless channel characteristics such as a higher frequency, a wider bandwidth, and a larger phase noise/Doppler shift due to a high frequency band than a conventional NR.

When a large SCS is used in the HF NR system, an OFDM symbol and a slot interval become smaller as the SCS increases, and thus cell planning for management/operation with reduced cell coverage may be considered. However, if not (e.g., cell coverage is maintained to correspond to the existing NR level or does not decrease in inverse proportion to large SCS), coverage supplementation may be required for physical channel/signal transmission. In addition, since a CP length is reduced due to use of a large SCS, it may be necessary to consider an effect of delay spread and phase noise of a radio channel, beam switching time, and the like.

For example, in the case of (NZP) CSI-RS resources configured/transmitted for BM use, when a symbol gap is configured to ensure a beam switching time between CSI-RS resources in consideration of CP shortening due to the large SCS, a problem may arise in that the maximum number of CSI-RS resources to be configured/transmitted within one slot (in the form of TDM) is reduced than before. As another example, the (NZP) CSI-RS resource to be currently configured for BM use includes only one symbol, and considering symbol shortening and coverage loss due to the large SCS, the smallest unit of CSI-RSs that are transmitted and received with a fixed (BS Tx beam, or UE Rx beam) needs to be configured to a plurality of symbols or a plurality of CSI-RS resources.

As another example, in the case of a slot offset Kc for determining a triggering DCI-to-RS transmission timing for aperiodic (NZP) CSI-RS resource transmission, currently, the same one value is commonly applied to multiple resources (belonging to a single resource set). In detail, CSI-RS configuration information may include one or more CSI-RS resource set configuration information, and each CSI-RS resource set configuration (setting) information may include the following information.

TABLE 3 nzp-CSI-ResourceSetId (=CSI-RS resource set identifier)
one or more nzp-CSI-Resource configuration (setting) information
repetition: ON, OFF
aperiodicTriggeringOffset (=Slot offset Kc): 0~6

Each nzp-CSI-Resource configuration (setting) information may include the following information

TABLE 4 nzp-CSI-ResourceId (=CSI-RS resource)
resource mapping information: OFDM symbol position within slot, subcarrier allocation within RB
power control information
scrambling ID Triggering DCI for aperiodic (NZP) CSI-RS resource transmission may indicate a CSI-RS triggering state. The CSI-RS triggering state may be indicated through, for example, a CSI request field. One CSI-RS triggering state is mapped to one CSI-RS resource set. That is, one slot offset is allocated for each CSI-RS resource set, and a CSI-RS triggering state indicated by DCI is mapped to one CSI-RS resource set. Accordingly, when DCI is received in slot n and a slot offset set in the CSI-RS resource set corresponding to the CSI-RS triggering state is Kc, transmission and reception of the corresponding CSI-RS resource set is triggered in slot n+Kc. As a result, through a single DCI, (NZP) CSI-RS resources configurable within a maximum of one slot may be simultaneously triggered. Similarly, if a symbol gap is configured to ensure a beam switching time between (NZP) CSI-RS resources in consideration of CP shortening due to a large SCS, there may be a problem in that the maximum number of (NZP) CSI-RS resources to be configured/transmitted within one slot (in the form of TDM) (i.e., the maximum number of aperiodic (NZP) CSI-RS resources to be triggered through a single DCI) is reduced than before.

Hereinafter, a CSI-RS resource configuration and setting method considering beam switching time and coverage loss due to a large SCS is proposed. The proposed method of the present disclosure mainly describes (NZP) CSI-RS resources for BM use, but is not limited thereto, and may also be applied to CSI-RS resource configuration/setting for other uses than BM. In addition, the proposed method of the present disclosure may be equally/similarly applied to configuration/setting of SRS resources for UL BM uses. For example, in the description below, the proposed method/principle of the present disclosure may be applied in the same/similar manner in a state where the CSI-RS resource is replaced with an SRS resource for UL BM. In addition, the proposed method of the present disclosure may be equally/similarly applied to configuration/setting of SRS resources for other uses than UL BM.

The proposed method according to the present disclosure may be applied only when a large SCS is configured/applied to an RS resource set (e.g., CSI-RS resource set, SRS resource set). On the other hand, when an existing SCS (e.g., 15 KHz, 30 KHz, 60 KHz, 120 KHz) is configured/applied to the RS resource set, an operation according to the conventional method may be performed. For example, an RS resource set may be configured based on FIG. 12. The operations of FIGS. 8 to 11 may be basically applied to the proposed method of the present disclosure. Accordingly, in the proposed method of the present disclosure, it may be understood that the RS resource set configuration and operation depending on the SCS applied to the RS resource set vary. The SCS applied to the RS resource set may be configured based on cell configuration information and/or RS resource configuration information, or may be dynamically indicated through DCI.

For convenience, the existing SCS set (e.g., 15 KHz, 30 KHz, 60 KHz, 120 KHz) may be referred to as a first SCS range (or a normal SCS range), and the large SCS set (e.g., 240 KHz, 480 KHz), 960 KHz) may be referred to as a second SCS range (or, a large SCS range). The first SCS range and the second SCS range may not overlap. Although not limited thereto, the maximum value of the first SCS range may be defined as 120 KHz, and the minimum value of the second SCS range may be defined as 240 (=120*2) or 480 (=120*4) KHz. The large SCS may be used equivalently to the large SCS range.

For convenience, each proposed method is separately described, but they may be used in combination with each other as long as they do not contradict each other.

[Proposed Method 1] Symbol Configuration Method of CSI-RS Resources

1) Opt 1

SCS_c applied to CSI-RS resource signal configuration/transmission may be configured to a value greater than SCS_d applied to general data (e.g., PDSCH) transmission. Since the time length of an (OFDM) symbol is inversely proportional to the SCS, when SCS_c is configured greater than SCS_d, the time length of a symbol for a CSI-RS signal may become smaller than the time length of a symbol for data. For example, when SCS_c=N*SCS_d, N CSI-RS symbols correspond to one data symbol in the time domain. Since the symbol for CSI-RS corresponds to a part of the symbol for data, for convenience, the symbol for CSI-RS is referred to as a (sub) symbol. In this case, the (sub) symbol position of the CSI-RS resource may be configured to the (normal) symbol index M of the SCS_d reference. In this case, the corresponding CSI-RS resource may be mapped/transmitted to the first or last sub-symbol in the normal-symbol interval of index M, and there may be no signal mapping/transmission of the remaining sub-symbols.

2) Opt 2

An RE set including the CSI-RS resource (on the same OFDM symbol) may be configured in the form of a discontinuous comb having equal intervals. In this case, a plurality of sub-symbols composed of the same signal may be repeated within a symbol interval according to CSI-RS resource mapping. For example, when a CSI-RS resource comb is composed of N REs, a plurality of N sub-symbols composed of the same signal may be repeated within one OFDM symbol interval. In this case, an operation may be defined to allow the BS and the UE to transmit and receive CSI-RS with a fixed Tx beam-Rx beam during a plurality of sub-symbol intervals (excluding beam switching time). That is, a portion of a plurality of sub-symbol intervals may be used as a beam switching time, and CSI-RS may be transmitted/received during the remaining sub-symbols.

3) Opt 3

The CP length of the CSI-RS resource transmission symbol may be configured to be larger (e.g., extended CP) than the CP (e.g., normal CP) of the normal data symbol. Such CP length configuration may be limited only when an SCS greater than or equal to a specific value is configured. In this case, the minimum time interval between two resources (configurable) when the extended CP is configured may be defined as a smaller value than when the normal CP is configured (e.g., 0-symbol for extended CP, 1-symbol for normal CP).

[Proposed method 2] CSI-RS resource (group) configuration method

1) Opt 1

Figure 13:
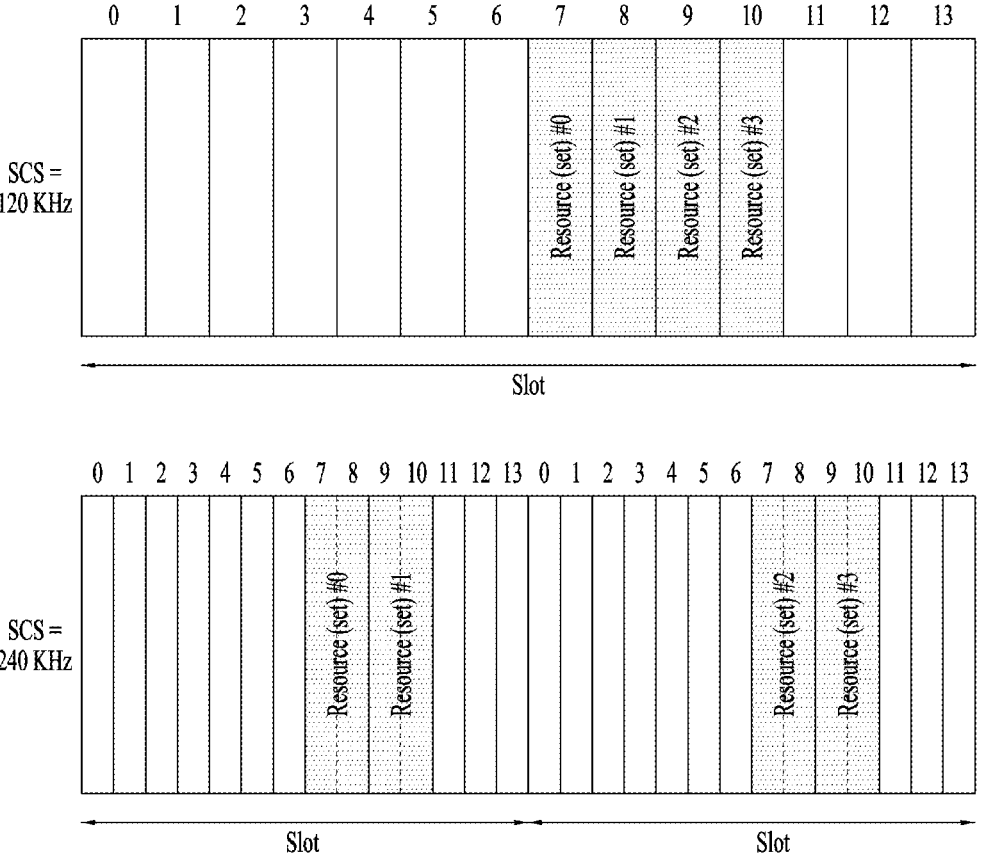
FIGS. 13 to 17 illustrate a CSI-RS feedback procedure according to an example of the present disclosure.

(On the premise that the existing single CSI-RS resource is configured in units of L-symbols (e.g., L=1)), a single resource may be configured in the form in which a unit L-symbol is repeated/mapped adjacently N times on the CSI-RS resource configuration (setting). FIG. 13 shows an example of a CSI-RS resource according to a SCS. Referring to FIG. 13, in the case of an existing SCS, a single resource may be configured in the form in which a CSI-RS resource is configured in units of L-symbols (e.g., L=1), and in contrast, in the case of a large SCS, a single resource may be configured in the form in which a CSI-RS resource is repeated/mapped adjacently N times (e.g., N=2) (N*L-symbol units).

{N*L} symbols may be one symbol group constituting a single resource. During one symbol group, an operation may be defined to allow the BS and the UE to transmit and receive CSI-RS with a fixed Tx beam-Rx beam.

ABS Tx beam (sweeping) selection operation based on (CSI-RS resource) repetition OFF configuration may be performed in units of symbol groups. That is, the BS Tx beam may be fixed within each symbol group and the BS Tx beam may be changed between adjacent symbol groups. In addition, a UE Rx beam (sweeping) selection operation based on (CSI-RS resource) repetition ON configuration may be performed in units of symbol groups. That is, the UE Rx beam may be fixed within each symbol group and the UE Rx beam may be changed between adjacent symbol groups.

2) Opt 2

Figure 14:
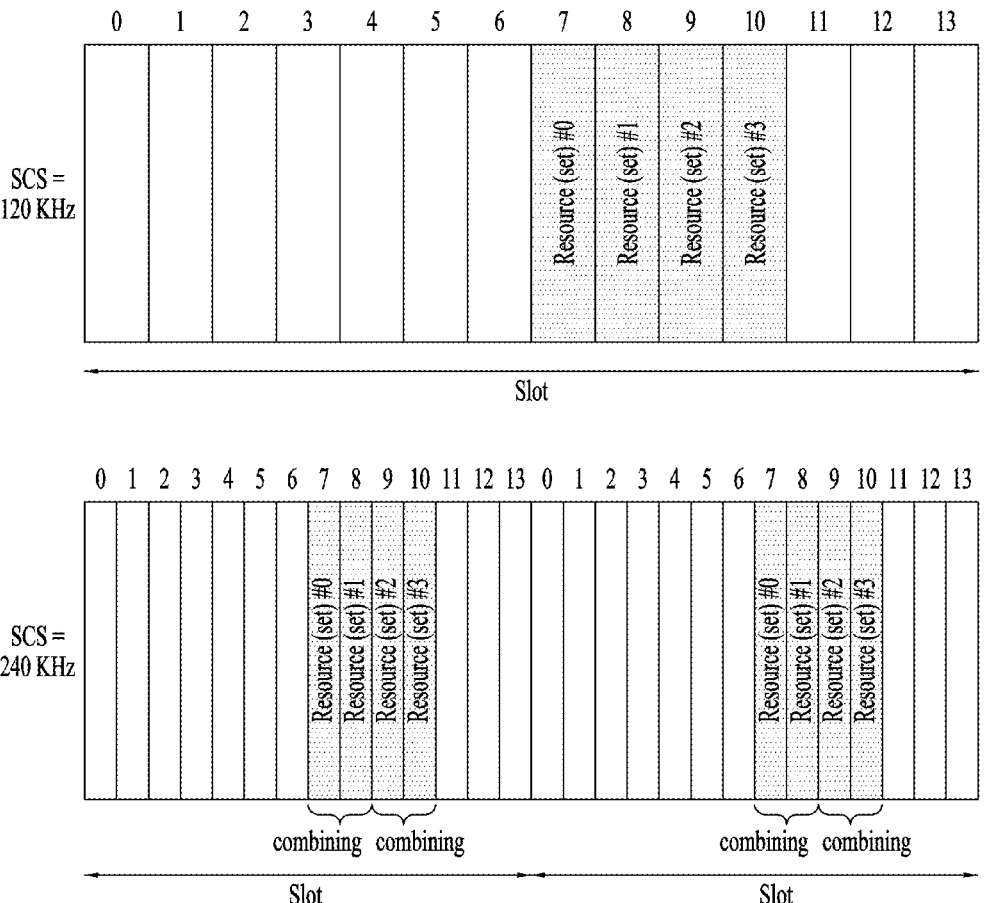

(In a state in which a single CSI-RS resource is configured with an L-symbol as before), N resources adjacent in time within the resource set on the CSI-RS resource set (or CSI-resource) configuration (setting) may be configured to be combined. FIG. 14 shows an example of a CSI-RS resource according to an SCS. Referring to FIG. 14, in the case of an existing SCS, the CSI-RS resource is configured in units of L-symbols (e.g., L=1), and in contrast, in the case of a large SCS, a CSI-RS resource is configured in units of L-symbols (e.g., L=1), but N resources adjacent in time within the resource set may be combined.

(combined) N resources may be one resource group. During one resource group, an operation may be defined to allow the BS and the UE to transmit and receive CSI-RS with a fixed Tx beam-Rx beam.

In this case, a BS Tx beam (sweeping) selection operation (i.e., in which a BS Tx beam is fixed in each resource group and a BS Tx beam is changed between adjacent resource groups) based on (CSI-RS resource) repetition OFF configuration may be performed in units of resource groups or a UE Rx beam (sweeping) selection operation (i.e., in which a UE Rx beam is fixed in each resource group and a UE Rx beam is changed between adjacent resource groups) based on (CSI-RS resource) repetition ON configuration may be performed in units of resource groups.

3) Opt 3

If a time interval between (adjacent) two CSI-RS resources belonging to the same CSI-RS resource set is equal to or less than Ng symbols (in a state where a single CSI-RS resource is configured with L-symbols), the two CSI-RS resources may be configured to be combined.

(Combined) adjacent resources may become one resource group. During one resource group, an operation may be defined to allow the BS and the UE to transmit and receive CSI-RS with a fixed Tx beam-Rx beam.

ABS Tx beam (sweeping) selection operation based on (CSI-RS resource) repetition OFF configuration may be performed in units of resource groups. That is, the BS Tx beam may be fixed within each resource group and the BS Tx beam may be changed between adjacent resource groups. In addition, a UE Rx beam (sweeping) selection operation based on (CSI-RS resource) repetition ON configuration may be performed in units of resource groups. That is, the UE Rx beam may be fixed within each resource group and the UE Rx beam may be changed between adjacent resource groups.

[Proposed Method 3] Method for Simultaneous Triggering of CSI-RS Resources

1) Opt 1

The slot offset Kc value may be separately configured for each CSI-RS resource (within a CSI-RS resource set configured for the same/single aperiodic CSI-RS transmission/feedback operation). In this case, transmission of multiple CSI-RS resources to which separate (e.g., different) slot offset Kc values are configured/applied may be simultaneously triggered through a single/same DCI.

For example, in the case of the existing SCS, the CSI-RS resource configuration may be configured based on Tables 3 to 4. In contrast, in the case of the large SCS, the CSI-RS resource configuration may be configured as follows.

TABLE 5

[CSI-RS resource set configuration (setting) information]
nzp-CSI-ResourceSetId (=CSI-RS resource set identifier)
one or more nzp-CSI-Resource configuration information
repetition: ON, OFF

TABLE 6

[nzp-CSI-Resource configuration (setting) information]
nzp-CSI-ResourceId (=CSI-RS resource)
resource mapping information: OFDM symbol position within slot, subcarrier allocation within RB
power control information
scrambling ID
aperiodicTriggeringOffset (=slot offset Kc): 0~6

Figure 15:
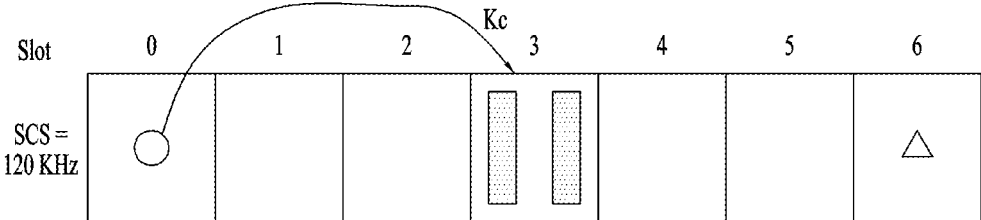

FIG. 15 shows an example of a CSI-RS transmission/feedback procedure according to an SCS. Referring to FIG.

14

15, in the case of the existing SCS, a slot offset Kc may be configured for each CSI-RS resource set (refer to Tables 3 and 4), and transmission of a plurality of CSI-RS resources belonging to a CSI-RS resource set within a maximum of one slot may be simultaneously triggered through a single/same DCI. In contrast, in the case of a large SCS, a plurality of CSI-RS resources belonging to the same CSI-RS resource set may be distributed over a plurality of slots, and slot offset Kc may be configured for each CSI-RS resource, not for the CSI-RS resource set (refer to Tables 5 to 6). Accordingly, even in the case of a large SCS, transmission of a plurality of CSI-RS resources belonging to one CSI-RS resource set may be simultaneously triggered through a single/same DCI.

2) Opt 2

A relative slot offset Kr value may be separately configured for each CSI-RS resource (within a CSI-RS resource set configured in the same/single aperiodic CSI-RS transmission/feedback operation). The sum of (1) a slot offset Kc value given as a CSI-RS resource set configuration (setting) and (2) a relative slot offset Kr (that is, Kc+Kr) may be configured as a final slot offset (for determining DCI-to-RS timing) applied for each CSI-RS resource. In this case, transmission of a plurality of CSI-RS resources to which the final slot offset {Kc+Kr} configured based on the separate (different) relative slot offset Kr values is applied may be simultaneously triggered through a single/same DCI.

For example, in the case of the existing SCS, the CSI-RS resource configuration may be configured based on Tables 3 to 4. In contrast, in the case of the large SCS, the CSI-RS resource configuration may be configured as follows.

TABLE 7

[CSI-RS resource set configuration (setting) information]
nzp-CSI-ResourceSetId (=CSI-RS resource set identifier)
one or more nzp-CSI-Resource configuration information
repetition: ON, OFF
aperiodicTriggeringOffset (=slot offset Kc): 0~6

TABLE 8

[CSI-RS resource configuration (setting) information]
nzp-CSI-ResourceId (=CSI-RS resource)
resource mapping information: OFDM symbol position within slot, subcarrier allocation within RB
power control information
scrambling ID
Relative aperiodicTriggeringOffset (=relative slot offset Kr): 0~N − 1

Figure 16:
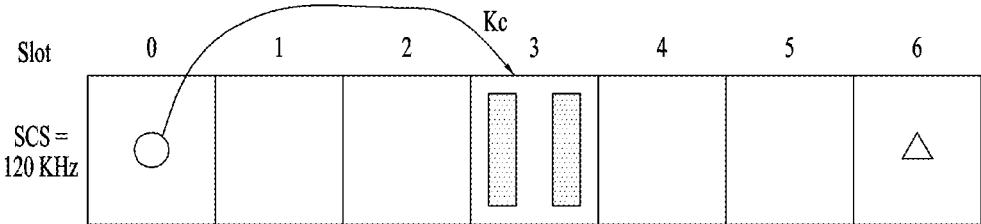
Figure 16:
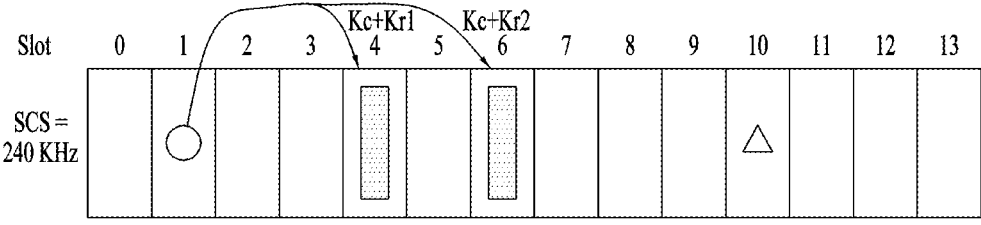

FIG. 16 shows an example of a CSI-RS transmission/feedback procedure according to an SCS. Referring to FIG. 16, in the case of the existing SCS, a slot offset Kc may be configured for each CSI-RS resource set (refer to Tables 3 and 4), and transmission of a plurality of CSI-RS resources belonging to a CSI-RS resource set within a maximum of one slot may be simultaneously triggered through a single/same DCI. In contrast, in the case of a large SCS, a plurality of CSI-RS resources belonging to the same CSI-RS resource set may be distributed over a plurality of slots. In this case, a common slot offset Kc may be configured for each CSI-RS resource set, and a relative slot offset Kr may be configured for each CSI-RS resource (refer to Tables 7 to 8). Accordingly, the separate slot offset corresponding to each CSI-RS resource may be determined as [Kc+Kr], and even in the case of a large SCS, transmission of a plurality of CSI-RS resources belonging to one CSI-RS resource set may be simultaneously triggered through a single/same DCI.

A plurality of CSI-RS resource sets (in which a slot offset Kc value is configured independently) may be configured for (the same/single) aperiodic CSI-RS transmission/feedback operation on CSI-resource configuration (setting) (that is, it may be configured as one candidate for the same/single DCI triggering target). In this case, transmission of a plurality of CSI-RS resource sets to which independent (e.g., different) slot offset Kc values are configured/applied may be simultaneously triggered through a single/same DCI.

For example, in the case of the existing/large SCS, all CSI-RS resource configurations may be configured based on Tables 3 to 4. Instead, a mapping relationship between the CSI triggering state (e.g., a value of a CSI request field) indicated by the DCI and the CSI-RS resource set may be configured based on the SCS as follows.

TABLE 9

| CSI triggering state | Existing SCS | large SCS |
|---|---|---|
| 000 | 1st CSI-RS resource set configured by higher layer | 1st CSI-RS resource set(s) configured by higher layer |
| 001 | 2nd CSI-RS resource set configured by higher layer | 2nd CSI-RS resource set(s) configured by higher layer |
| 010 | 3rd CSI-RS resource set configured by higher layer | 3rd CSI-RS resource set(s) configured by higher layer |
| . . . | . . . | . . . |
| 111 | 8th CSI-RS resource set configured by higher layer | 8th CSI-RS resource set(s) configured by higher layer |

Figure 17:
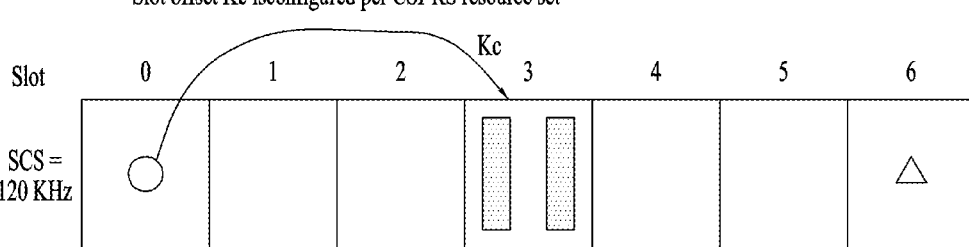
Figure 17:
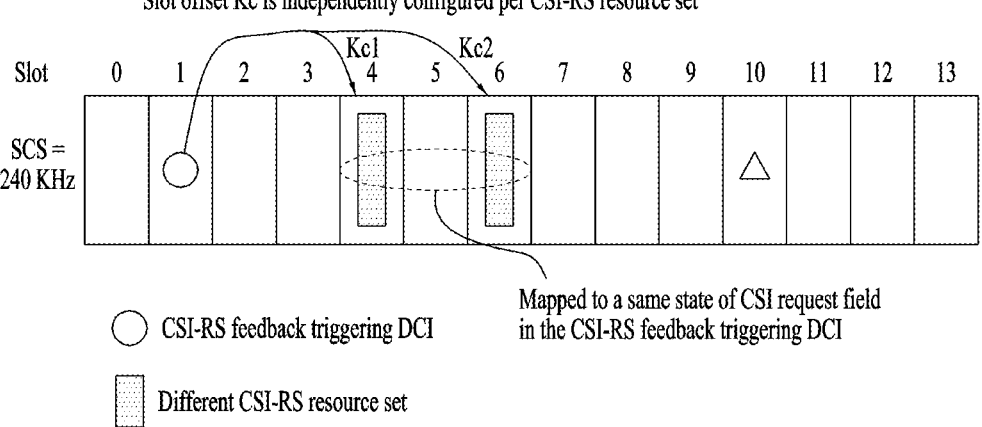

FIG. 17 shows an example of a CSI-RS transmission/feedback procedure. Referring to FIG. 17, in the case of the existing/large SCS, a slot offset Kc may be configured for each CSI-RS resource set (refer to Tables 3 and 4). In the case of the existing SCS, each state value of a CSI request field in the DCI may be mapped to one CSI-RS resource set. Thus, transmission of a plurality of CSI-RS resources belonging to a CSI-RS resource set within the maximum of one slot may be simultaneously triggered through a single/same DCI. In contrast, in the case of a large SCS, each state value of a CSI request field in the DCI may be mapped to one or more, in detail, a plurality of CSI-RS resource sets. Thus, transmission of different CSI-RS resource sets within a plurality of slots may be simultaneously triggered through a single/same DCI.

The various descriptions, functions, procedures, proposals, methods, and/or operational flowcharts proposals of the present disclosure described above in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable storage medium may store at least one instruction or program, and the at least one instruction or program may cause, when executed by at least one processor, the at least one processor to perform operations according to some embodiments or implementations of the present disclosure.

In the present disclosure, a computer program may be recorded in at least one computer-readable (non-volatile) storage medium, and may include a program code that causes (at least one processor) to perform an operation when being executed according to some embodiments or implements of the present disclosure. The computer program may be provided in the form of a computer program product. The computer program product may include at least one computer readable (non-volatile) storage medium, and the computer readable storage medium may include a program code that causes (at least one processor) to perform an operation when being executed according to some embodiments or implements of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

A communication device of the present disclosure includes at least one processor; and at least one computer memory operably connected to the at least one processor and configured to store instructions for causing, when executed, the at least one processor to perform operations according to example(s) of the present disclosure described later.

Figure 18:
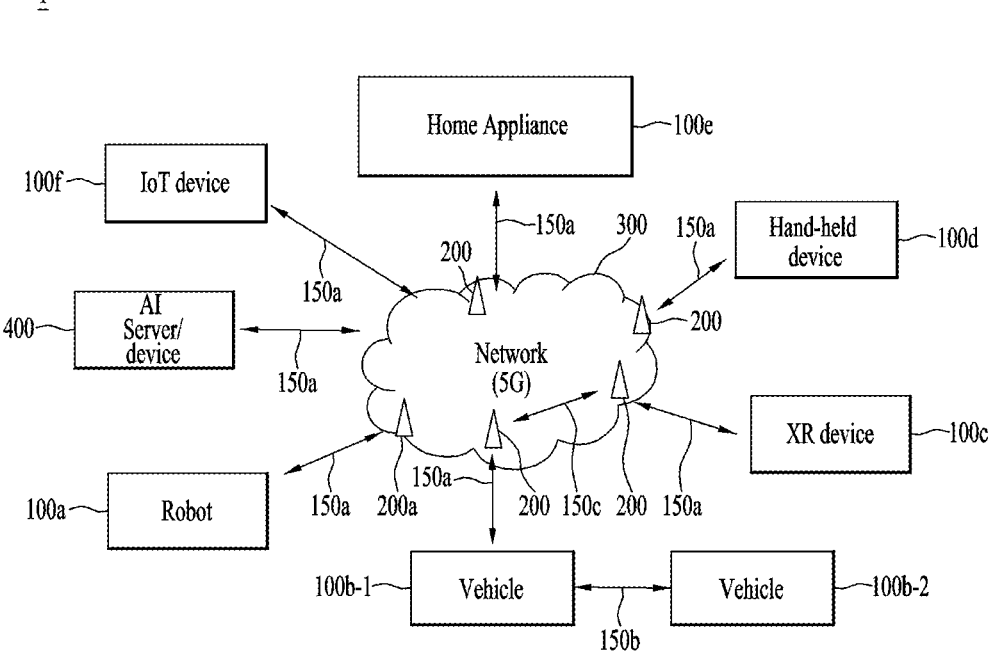
FIGS. 18 to 21 illustrate a communication system 1 and wireless devices, which are applied to the present disclosure.

FIG. 18 illustrates a communication system 1 applied to the present disclosure.

Referring to FIG. 18, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a B S/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
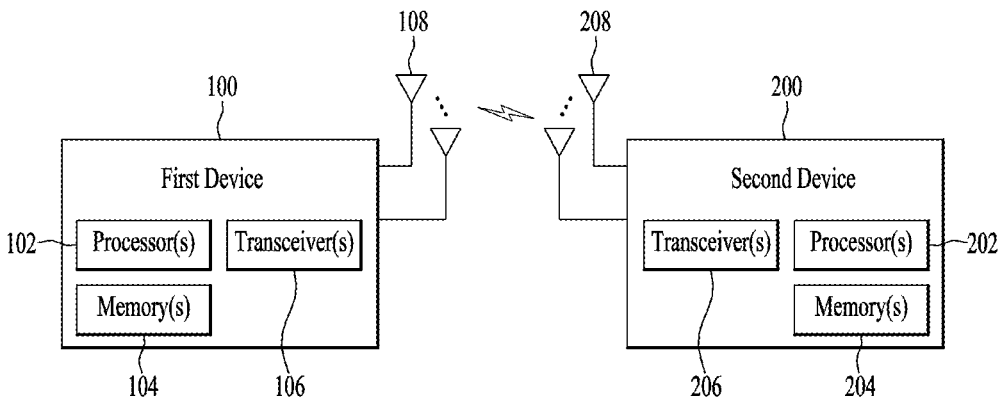

FIG. 19 illustrates wireless devices applicable to the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
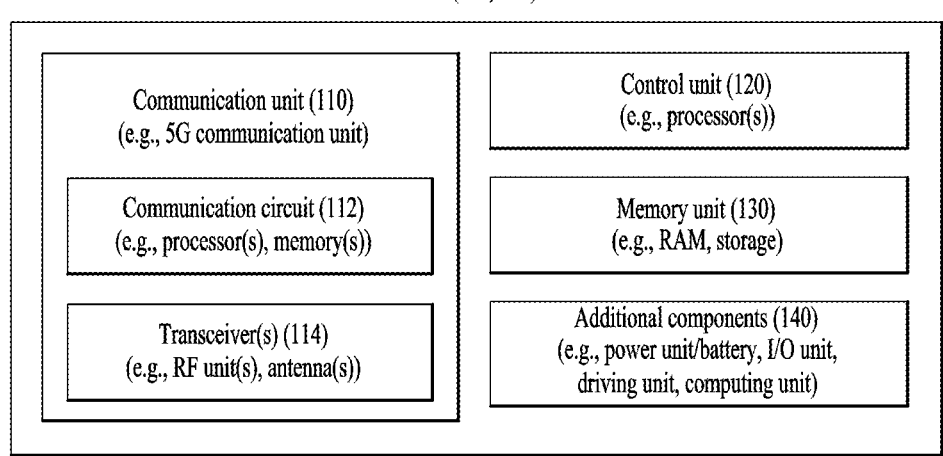

FIG. 20 illustrates another example of a wireless device applied to the present disclosure. The wireless device may be implemented in various forms according to a use-case/service (refer to FIG. 18).

Referring to FIG. 20, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 21:
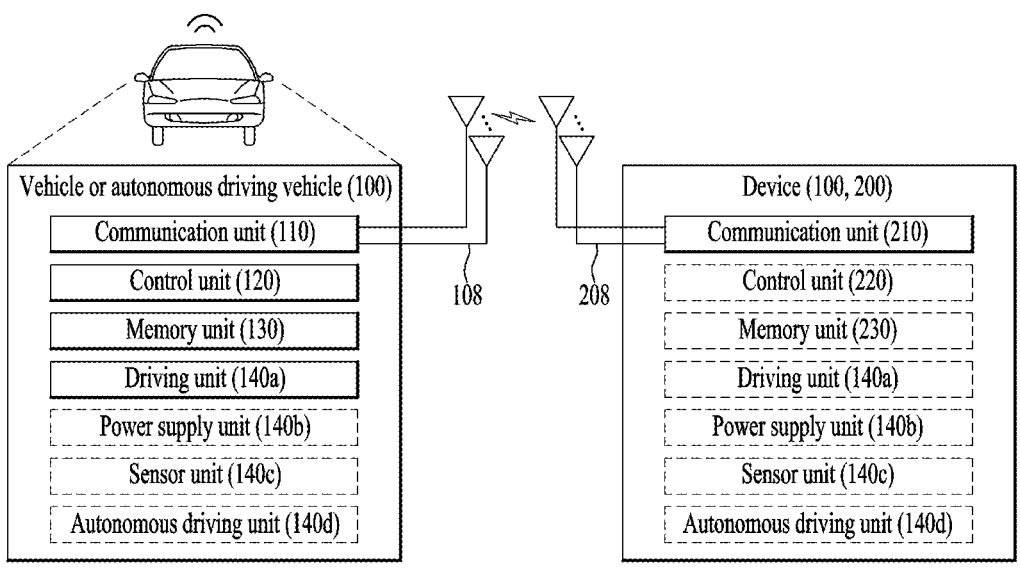

FIG. 21 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 21, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure is applicable to UEs, eNBs or other apparatuses of a wireless mobile communication system.

The invention claimed is:

1. A method comprising:

receiving, by a user equipment (UE), configuration information related to a channel state information reference signal (CSI-RS) resource set;

receiving, by the UE, a downlink control channel including downlink control information, wherein the downlink control information including a CSI request field indicating a CSI triggering state; and receiving, by the UE, at least one aperiodic CSI-RS resource in the CSI-RS resource set related to the CSI triggering state, wherein, based on a subcarrier spacing (SCS) related to the at least one aperiodic CSI-RS resource being less than or equal to 120 kHz, the at least one aperiodic CSI-RS resource related to the CSI triggering state is received only within one slot of the CSI-RS resource set, and wherein, based on the SCS related to the at least one aperiodic CSI-RS resource being exceeding 120 kHz, the at least one aperiodic CSI-RS resource related to the CSI triggering state is received over a plurality of slots of the CSI-RS resource set.

2. The method of claim 1, wherein the CSI-RS resource set is for downlink beam management, and a corresponding transmit beam-receive beam pair is applied to each CSI-RS resource in each CSI-RS resource set, and wherein the transmit beam-receive beam pair is changed in units of CSI-RS resources.

3. The method of claim 1, further comprising:
transmitting a measurement result of the CSI-RS resource set.

4. A user equipment (UE) comprising:
at least one radio frequency (RF) unit;
at least one processor; and
at least one computer memory operatively connected to the at least one processor and configured to cause the at least one processor to perform an operation when being executed, the operation comprising:
receiving configuration information related to a channel state information reference signal (CSI-RS) resource set;
receiving a downlink control channel including downlink control information,
wherein the downlink control information including a CSI request field indicating a CSI triggering state; and
receiving at least one aperiodic CSI-RS resource in the CSI-RS resource set related to the CSI triggering state,
wherein, based on a subcarrier spacing (SCS) related to the at least one aperiodic CSI-RS resource being less than or equal to 120 kHz, the at least one aperiodic CSI-RS resource related to the CSI triggering state is received only within one slot of the CSI-RS resource set, and
wherein, based on the SCS related to the at least one aperiodic CSI-RS resource being exceeding 120 kHz, the at least one aperiodic CSI-RS resource related to the CSI triggering state is received over a plurality of slots of the CSI-RS resource set.

5. The UE of claim 4, wherein the CSI-RS resource set is for downlink beam management, and a corresponding transmit beam-receive beam pair is applied to the CSI-RS resource set, and wherein the transmit beam-receive beam pair is changed in units of CSI-RS resource sets.

6. The UE of claim 4, wherein the operation further includes transmitting a measurement result of the CSI-RS resource set.

7. A method comprising:
transmitting, by a base station, BS, configuration information related to a channel state information reference signal (CSI-RS) resource set;
transmitting, by the BS, a downlink control channel including downlink control information,
wherein the downlink control information including a CSI request field indicating a CSI triggering state; and
transmitting at least one aperiodic CSI-RS resource in the CSI-RS resource set related to the CSI triggering state,
wherein, based on a subcarrier spacing (SCS) related to the at least one aperiodic CSI-RS resource being less than or equal to 120 kHz, the at least one aperiodic CSI-RS resource related to the CSI triggering state is received only within one slot of the CSI-RS resource set, and
wherein, based on the SCS related to the at least one aperiodic CSI-RS resource being exceeding 120 kHz, the at least one aperiodic CSI-RS resource related to the CSI triggering state is received over a plurality of slots of the CSI-RS resource set.

* * * * *